March 10, 1925. 1,529,280
F. C. SUTTER
AUTOMOBILE RADIATOR SHIELD AND SHIELD OPERATING DEVICE
Filed March 19, 1920
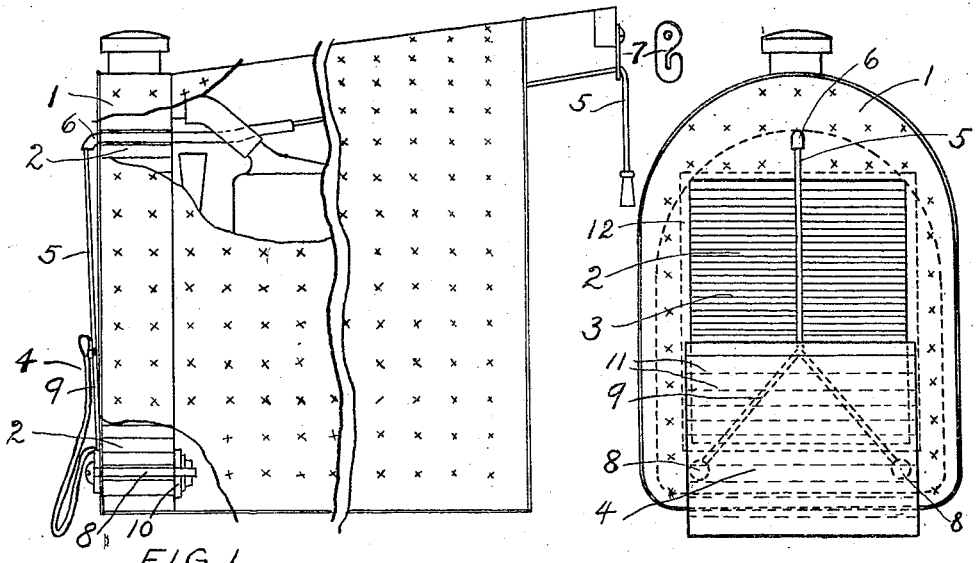
FIG. 1.   FIG. 2.
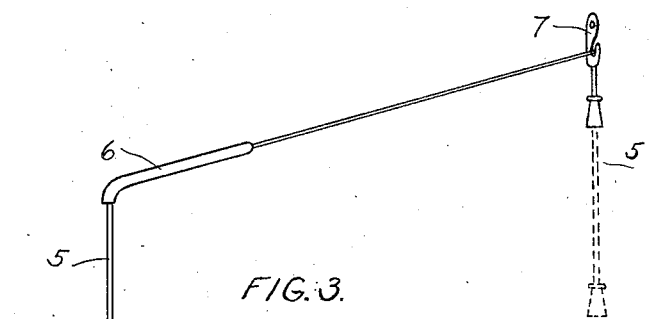
FIG. 3.
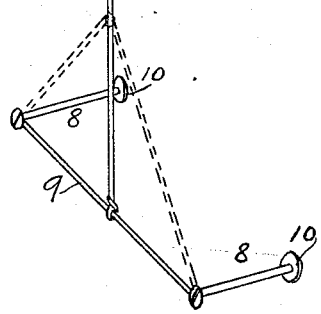
Frederick C. Sutter
INVENTOR Patented Mar. 10, 1925.

1,529,280

UNITED STATES PATENT OFFICE.

FREDERICK C. SUTTER, OF DETROIT, MICHIGAN.

AUTOMOBILE RADIATOR SHIELD AND SHIELD-OPERATING DEVICE.

Application filed March 19, 1920. Serial No. 367,046.

*To all whom it may concern:*

Be it known that I, FREDERICK C. SUTTER, a citizen of the United States, residing at No. 174 Canfield Avenue, West, in the city of Detroit, county of Wayne, and State of Michigan, have invented new and useful Improvements in Automobile Radiator Shields and Shield-Operating Devices, of which the following is a specification.

This invention has for its object the control of motor temperatures by the driver of the automobile without leaving his seat or altering the speed of the car.

It has long been common knowledge that the gasoline motor must be hot to operate efficiently and satisfactorily. To enable automobile motors to attain proper temperatures during cold weather it has been and is customary to obstruct the flow of air through the radiator by means of cardboard or other material, spring-roller curtains, hand folded flaps, manually or automatically operated shutters etc., the object in all cases being the same, namely, the reduction of the amount of the radiator surface exposed.

The ideal radiator shield should be inexpensive, easy to attach to any existing car with little, if any, tool work, easily adjusted in any position by the driver without leaving his seat or altering the speed of the car, free from liability of derangement by mud, sleet or snow, and it should afford ample protection against cooling while the car stands idle. An ideal control for such shields or flaps must not only operate satisfactorily but must be of such form that it may be easily applied to existing shields or radiator cover flaps without altering such flaps or be applied to standard covers without changing the design and construction of same. My shields and controls meet these requirements and are shown in the accompanying drawing in which;

Fig. 1 is a side view of the front portion of an automobile protected by a conventional hood and radiator cover equipped with my device for adjusting the flap, portions being broken away to show details. Fig. 2 is a front view of same, in both views the flap being partly raised. Fig. 3 is a perspective view of my control device detached from the flap or shield, in which the solid lines show the position of the control when the flap is fully lowered and the dotted lines show the position of the elastic member and control cord when the flap is partly raised, similar numerals referring to similar parts in all figures.

1 is the radiator cover having the opening 3 which exposes the active surface of the radiator 2 and which may be closed entirely or in part by the flap 4 one edge of which is attached to the radiator cover or is integral with same at the lower edge of the opening 3. Connected to the free end of the flap 4 is the flexible control member 5 which leads upward in front of the radiator and passes through an upper air passage of the radiator being guided and protected from chafing by means of the tube 6 inserted in the air passage, the control member passing through this tube, and passing to holding member 7 which is located convenient to the driver's seat, being usually held at the lower edge of the instrument board. The elastic member 9, in repose, extends horizontally across the radiator at the lower edge of the opening 3 and has its ends fixed in position by means of the slender bolts 8 which pass through air spaces of the radiator, washers and nuts being indicated at 10. Bolts 8 also serve to hold the lower portion of the radiator cover in position. Elastic member 9 is attached, near its middle point, to the free end of flap 4 adjacent to the point of attachment of control member 5. Horizontal quilting 11 assists the flap to assume a folded position. Around the edge of the opening 3 is a band of extra padding of wadding 12 which causes these edges to bulge forward somewhat and thus form a bearing or seat for the flap 4 when same is raised in order to more effectually prevent the entrance of cold air.

I have shown my shield and control as a portion of a conventional radiator cover but it is obvious that the cover itself may be discarded and the shield consist merely of a sheet of flexible material of sufficient size to cover the radiator. While I have shown my elastic member as a single homogeneous strand, it is evident that for convenience or economy this member may be made of two or more sections rather than a single unit, and it is self-evident that many forms of such elastic members may be devised such as solid or stranded india rubber belts or cables, spiral springs of small diameter or the like; I do not limit myself to any particular form of elastic means.

My shield and control operate as follows: To reduce the amount of radiator surface exposed, the driver, by pulling the control cord, raises the shield or flap to any desired height up to complete closing of the raidator. As this is done the elastic member is stretched upward in the form of an inverted letter V. When the driver wishes to secure additional cooling he may pay out the cord and the elastic member being in tension, will pull the shield downward, to a more or less folded position. Since the elastic member lies between the shield and the radiator it effectually strips the shield off the surface against which it is snugly pressed by the pressure of the air due to the motion of the car and by the fan suction. It is obvious that my shields, operated by this control, may be thickly wadded to secure heat insulation qualities, and have this advantage over shields or curtains of thin material, or metallic shutters which possess poor heat retaining qualities It is also obvious that many forms of holders for the control cord, methods of attachment of this cord and the elastic member to the shield or flap, various means of fixing the ends of the elastic member and also various styles of quilting or pleating of the shield may be employed; but with none of these is my invention chiefly concerned, what I claim being;

An adjustable radiator shield consisting of a sheet of flexible material having its lower edge attached to the lower edge of said radiator, a flexible control member attached to the free end of said sheet and leading to a holding means located near the driver's seat, an elastically extensible member extending horizontally across said radiator adjacent and parallel to the lower edge of said sheet, and affixed at its middle point to the free end of said sheet, and means for holding the ends of said elastic member in fixed position.

FREDERICK C. SUTTER.